(12) United States Patent
Daniel et al.

(10) Patent No.: US 10,857,612 B2
(45) Date of Patent: Dec. 8, 2020

(54) SYSTEM FOR MEASURING ENERGY USING DIGITALLY CONTROLLED WELDING POWER SOURCES

(71) Applicant: LINCOLN GLOBAL, INC., Santa Fe Springs, CA (US)

(72) Inventors: Joseph A. Daniel, Sagamore Hills, OH (US); Edward Hillen, Painesville, OH (US); William T. Matthews, Chesterland, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 567 days.

(21) Appl. No.: 15/605,129

(22) Filed: May 25, 2017

(65) Prior Publication Data

US 2017/0334013 A1 Nov. 23, 2017

Related U.S. Application Data (60) Division of application No. 12/361,928, filed on Jan. 29, 2009, now Pat. No. 9,687,931, which is a continuation-in-part of application No. 11/566,719, filed on Dec. 5, 2006, now Pat. No. 7,683,290.

(60) Provisional application No. 60/747,096, filed on May 12, 2006.

(51) Int. Cl.
*B23K 9/095* (2006.01)
*B23K 9/10* (2006.01)

(52) U.S. Cl.
CPC .......... *B23K 9/0953* (2013.01); *B23K 9/0956* (2013.01); *B23K 9/1043* (2013.01); *B23K 9/1056* (2013.01)

(58) Field of Classification Search
CPC .. B23K 9/0953; B23K 9/0956; B23K 9/1043; B23K 9/1056; B23K 9/095; B23K 31/12; B23K 31/125
See application file for complete search history.

(56) References Cited

U.S. PATENT DOCUMENTS

| | | |
|---|---|---|
| 2,395,062 A | 2/1946 | Nielsen |
| 3,431,390 A | 3/1969 | Manz |
| 4,855,566 A | 8/1989 | Hays et al. |
| 4,996,409 A | 2/1991 | Paton et al. |
| 5,043,557 A | 8/1991 | Tabata et al. |
| 5,117,088 A | 5/1992 | Stava |
| 5,714,729 A | 2/1998 | Yamada |
| 5,932,123 A | 8/1999 | Marhofer et al. |
| 6,066,835 A | 5/2000 | Hanks |
| 6,137,079 A | 10/2000 | Vincent et al. |
| 6,242,711 B1 | 6/2001 | Cooper |
| 6,388,232 B1 | 5/2002 | Samodell |
| 6,399,913 B1 | 6/2002 | Sammons |

(Continued)

FOREIGN PATENT DOCUMENTS

| | | |
|---|---|---|
| DE | 3711989 A1 | 10/1988 |
| JP | 2001-138051 | 5/2001 |

*Primary Examiner* — Dana Ross
*Assistant Examiner* — James F Sims, III
(74) *Attorney, Agent, or Firm* — Brad C. Spencer (57) ABSTRACT

A method and system for internally determining, within a welding power supply, the energy input into a weld during a welding operation. The method includes determining a total energy input into the weld during a first time period, and determining a length of the weld made during the first time period.

15 Claims, 8 Drawing Sheets

(56) References Cited

U.S. PATENT DOCUMENTS

| | | | |
|---|---|---|---|
| 6,441,342 B1* | 8/2002 | Hsu | B23K 9/091 219/130.01 |
| 6,498,321 B1 | 12/2002 | Fulmer et al. | |
| 6,596,970 B2 | 7/2003 | Blankenship et al. | |
| 6,703,585 B2 | 3/2004 | Suzuki | |
| 6,710,297 B1 | 3/2004 | Artelsmair et al. | |
| 6,730,875 B2 | 5/2004 | Hsu | |
| 6,930,279 B2 | 8/2005 | Myers et al. | |
| 7,091,445 B2 | 8/2006 | Myers et al. | |
| 2003/0071024 A1 | 4/2003 | Hsu | |
| 2003/0085210 A1 | 5/2003 | Hutchison et al. | |
| 2005/0051524 A1 | 3/2005 | Blankenship et al. | |
| 2005/0133488 A1 | 6/2005 | Blankenship et al. | |
| 2006/0207983 A1 | 9/2006 | Myers et al. | |
| 2006/0226131 A1 | 10/2006 | Stava et al. | |

* cited by examiner

SYSTEM FOR MEASURING ENERGY USING DIGITALLY CONTROLLED WELDING POWER SOURCES

REFERENCE TO RELATED APPLICATIONS

This application is a Divisional Application of U.S. patent application Ser. No. 12/361,928, filed on Jan. 29, 2009, which is a Continuation-In-Part of U.S. patent application Ser. No. 11/566,719 filed on Dec. 5, 2006, now U.S. Pat. No. 7,683,290 issued on Mar. 23, 2010, which claims the benefit of Provisional Application No. 60/747,096 filed on May 12, 2006, which are all incorporated herein by reference in their entirety.

BACKGROUND OF THE INVENTION

1. Field of the Invention

Devices, systems, and methods consistent with the invention relate to a measurement of energy imparted to a weld.

2. Description of the Related Art

The mechanical properties of a weld are related in part to the amount of energy input to the weld and the cooling rate of the workpiece material. If the amount of energy input to a weld is known, this value may be used in conjunction with the known cooling rate of the workpiece material to determine the mechanical properties of the weld for quality control purposes.

The amount of energy input to a weld is directly related to the voltage (V) and current (I) used to create the weld. In older related art systems voltage and current values do not widely vary during welding operations. Thus, in these systems, the amount of energy input into a weld may be measured using average voltage and current values, or RMS voltage and current values.

Unfortunately, many current welding processes have relatively complex output characteristics, which cause voltage (V) and current (I) values to be widely varied during welding operations. For these systems, averages or RMS determinations of voltage and current values are no longer acceptably accurate for determining the amount of energy input to welds. Accordingly, an accurate, simple and effective measurement of energy input to a particular weld is desired.

BRIEF SUMMARY OF THE INVENTION

The invention provides an accurate, simple and effective measurement of energy input.

According to an aspect of the invention, a method for monitoring a welding operation within a welding power supply is provided, the method including: determining a total energy input into a weld during a first time period; determining a length of the weld made during the first time period; and determining an energy input per unit length during the first time period using the determined total energy input and the determined length of the weld.

According to another aspect of the invention, a welding power supply configured to monitor a welding operation is provided, the power supply including: a first determiner to determine a total energy input into a weld during a first time period; a second determiner to determine a length of the weld made during the first time period; and a third determiner to determine the energy input per unit length during the first time period using the determined total energy input and the determined length of the weld.

According to another aspect of the invention, a method for monitoring a welding operation within a welding power supply is provided, the method including: determining a total energy input into a weld during a first time period; determining a change in a physical characteristic of a welding consumable used in the welding operation during the first time period; and determining an energy input per physical characteristic of the welding consumable during the first time period using the determined total energy input and the determined change in the physical characteristic of the welding consumable.

According to another aspect of the invention, a welding power supply configured to monitor a welding operation is provided, the welding power supply including: a first determiner to determine a total energy input into a weld during a first time period; a second determiner to determine a change in a physical characteristic of a welding consumable used in the welding operation during the first time period; and a third determiner to determine an energy input per physical characteristic of the welding consumable during the first time: period using the determined total energy input and the determined change in the physical characteristic of the welding consumable.

According to another aspect of the invention, a method for monitoring a welding operation within a welding power supply is provided, the method including: sampling pairs of instantaneous voltage and current values from a welding waveform during a first time period; determining instantaneous energy values from the sampled pairs of instantaneous voltage and current values; and summing the instantaneous energy values to determine a total energy input into a weld during the first time period.

According to another aspect of the invention, a welding power supply configured to monitor a welding operation is provided, the welding power supply including: a sampler to sample pairs of instantaneous voltage and current values from a welding waveform during a first time period; a first determiner to determine instantaneous energy values from the sampled pairs of instantaneous voltage and current values; a summer o sum the instantaneous energy values; and a second determiner to determine a total energy input into a weld during the first time period.

According to another aspect of the invention, a method for monitoring a hybrid welding operation is provided, the method including: determining an energy input into a weld by a first welding process during a first time period; determining an energy input into the weld by a second welding process during the first time period; determining a total energy input into the weld during the first time period by adding the energy input into the weld by the first welding process and the energy input into the weld by the second welding process; determining a length of the weld made during the first time period; and determining an energy input per unit length during the first time period using the determined total energy input and the determined length of the weld.

According to another aspect of the invention, a hybrid welding system is provided, the hybrid welding system including: a first determiner to determine an energy input into a weld by a first welding process during a first time period; a second determiner to determine an energy input into the weld by a second welding process during the first time period; a third determiner to determine a total energy input into the weld during the first time period by adding the energy input into the weld by the first welding process and the energy input into the weld by the second welding process; a fourth determiner to determine a length of the weld made during the first time period; and a fifth determiner to determine the energy input per unit length during the first time period using the determined total energy input and the determined length of the weld.

The above stated object as well as other objects, features and advantages of the invention will become clear to those skilled in the art upon review of the following, description.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
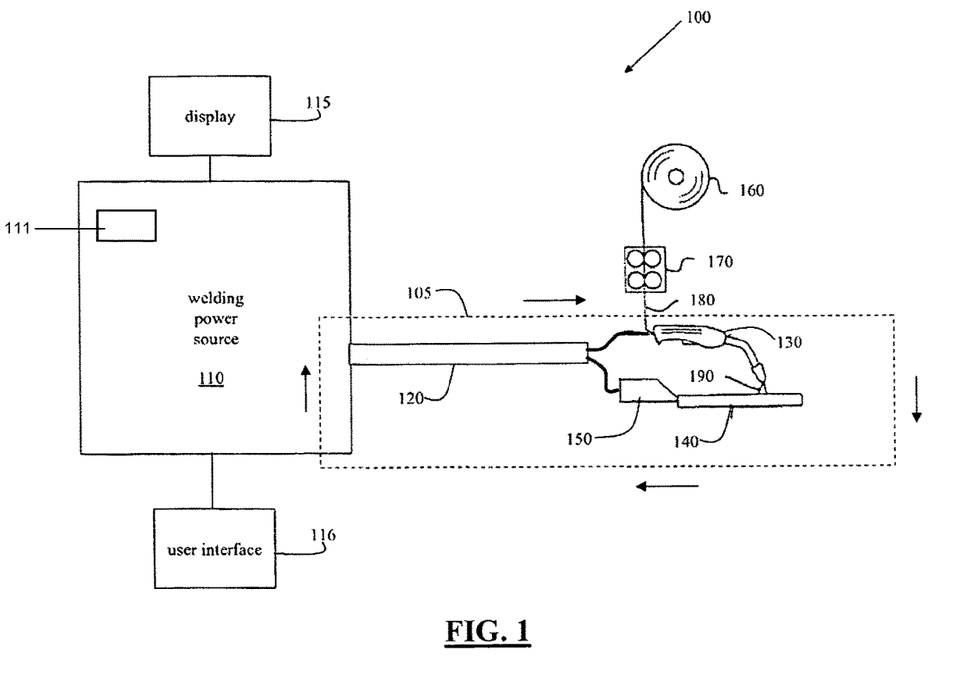
FIG. 1 is a diagram of a welding system according to an exemplary embodiment of the invention.

FIG. 1 is a diagram of a welding system according to an exemplary embodiment of the invention. The welding system 100 includes a welding power source 110, which generates output welding waveforms for welding operations. The welding power source 110 can be constructed in any appropriate manner.

The welding system 100 also includes a display 115 and a user interface 116. Display 115 is capable of displaying information in any suitable medium (e.g., for the operator to monitor), and is operationally connected to the welding power source 110 (e.g., by a wired or wireless connection). Alternatively, the display 115 may be an integral part of the welding power source 110. User interface 116 is capable of accepting information (e.g., from the operator), and is operationally connected to the welding power source 110 (e.g., by a wired or wireless connection). Alternatively, the user interface 116 may be an integral part of the welding power source 110. As a further alternative, display 115 and/or user interface 116 may be a portable electronic device (e.g., a laptop, PDA or smart-phone) that is operatively connected (e.g., by a wired or wireless connection) to the welding system 100.

Figure 2:
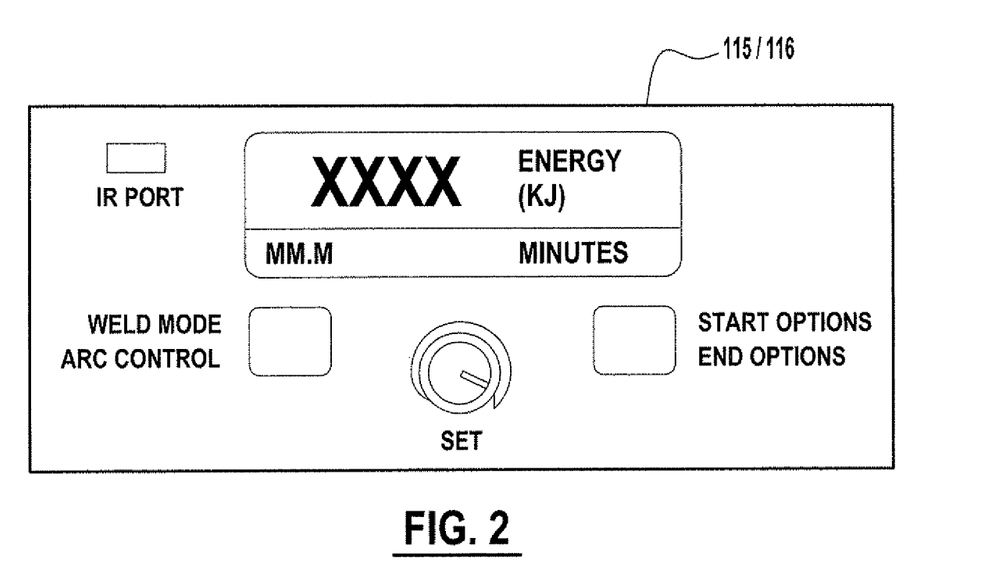
FIG. 2 shows an exemplary embodiment of a display according to an exemplary embodiment of the invention.

An exemplary embodiment of a combination display 115 I user interface 116 is shown in FIG. 2. This embodiment shows a digital display and various data entry controls and ports. Any number of suitable combinations of displays, controls and/or ports may be alternatively used, including virtual controls.

The welding system 100 further includes a welding cable 120, a welding tool 130, a workpiece connector 150, a wire supply 160, a wire feeder 170, a wire 180, and a workpiece 140. Welding tool 130 may be controlled to form a weld in any appropriate manner (e.g., manually, automatically, or semi-automatically). In this embodiment, welding tool 130 is a welding gun, but may also be a welding torch or consumable, depending on the welding process utilized.

In welding system 100, the wire 180 is fed into the welding tool 130 from the wire supply 160 via the wire feeder 170. In this embodiment, wire supply 160 is illustrated as a spool, but any appropriate wire supply strategy may be used, such as coiled or boxed wire supplies. In other embodiments, a welding torch may be used with separate electrodes (e.g., such as used in a stick welding process), and welding system 100 would not require the wire supply 160, the wire feeder 170, or the wire 180.

In welding system 100, the welding cable 120 is a single coaxial cable assembly, but any appropriate single- or multi-cable construction may be utilized. For example, the welding cable 120 may include a first cable length running from the welding power source 110 to the welding tool 130, and a second cable length running from the workpiece connector 150 to the welding power source 110.

In welding system 100, a welding output circuit path 105 runs from the welding power source 110 through the: welding cable 120; welding tool 130 (including the distal tip of wire 180); arc 190; workpiece 140; workpiece connector 150, and back through the welding cable 120 to the welding power source 110. Other appropriate welding output circuit paths exist for the alternative welding systems 100 discussed above. In FIG. 1, during welding operations, electrical current runs through the welding output circuit path 105 as a voltage is applied in response to an output welding waveform created by welding power source 110. Arc 190 is thereby formed between the welding tool 130/wire 180 and the workpiece 140. Arc 190 inputs energy into the workpiece 140 to form a weld.

As discussed above, the amount of energy input into the weld directly affects the physical properties of the resultant weld. In order to provide an accurate, simple and effective measurement of energy input by complex waveforms, it was determined by the inventors that the complex waveforms could be parsed into discrete sampling intervals, and, for each sampling interval, the instantaneous voltage and current could be recorded. Then, the product of the recorded voltage and current for each sampling interval could be summed, and this summed number could then be utilized to provide a more accurate representation of the energy input into a weld.

Figure 3:
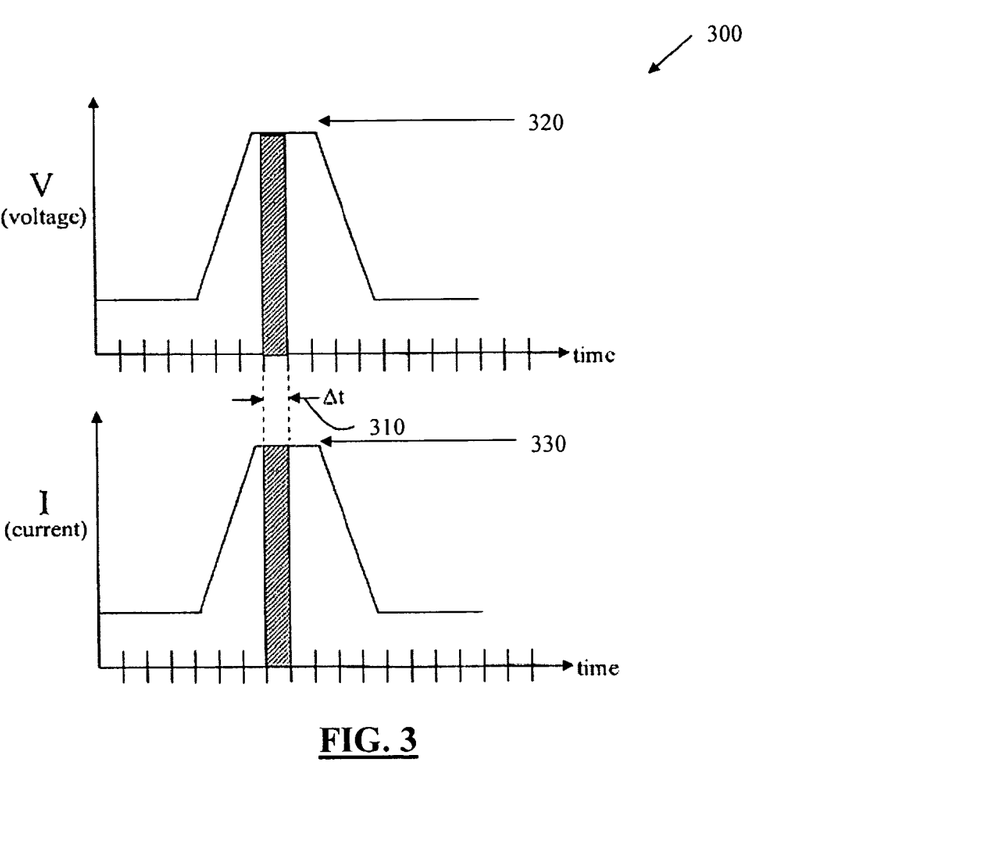
FIG. 3 is a diagram of a voltage and current measurement strategy according to an exemplary embodiment of the invention.

FIG. 3 illustrates an exemplary embodiment of an operation where an instantaneous voltage and current is measured during a sampling interval. In FIG. 3, measurement 300 of an output welding waveform's voltage 320 and current 330 over a sufficiently small sampling time 310 is performed. The duration of the sampling time 310 can be any appropriate time period, but should be set depending on the frequency content of the output welding waveforms voltage and current, and the accuracy desired. In this regard, the sampling interval should be small enough (i.e., the sampling rate should be high enough) to properly characterize the output welding waveform.

The sampled voltage 320, sampled current 330, and sampling time 310 are then multiplied to determine an instantaneous energy:

$$\text{instantaneous energy} = V_i * I_i * \Delta t_i \qquad (1)$$

This instantaneous energy value may then be integrated with respect to the output welding waveform over a total time to determine the total energy input to the weld during that time. The total time may be the arc time (e.g., the time during which an arc is maintained in making an arc weld), or any other desired time period. The total energy input may also be considered to be a sum of the product of multiple sets of sampled voltages and currents, and the total time, and can therefore be represented as:

$$\text{energy input over time} = \Sigma(V_i * I_i)n * \Delta t_t \qquad (2)$$

where N is the number of voltage and current sample pairs over the suitable time period.

Alternatively, or in addition, the true instantaneous power may be determined by multiplying the sampled voltage 320 and the sampled current 330, when the sampling time 310 is sufficiently small.

$$\text{instantaneous power} = V_i * I_i \qquad (3)$$

The true power input may be considered to be a sum of the products of multiple sets of sampled voltages and currents, divided by the number of sets of sampled voltages and currents, and car, therefore be represented as:

$$\text{true power input} = [\Sigma(V^i * I_i)n]/N \qquad (4)$$

where N is the number of voltage and current sample pairs over the suitable time period.

In this embodiment, the power source 110 is capable of performing the measurement of the instantaneous voltage and current, the determination of equations (1)-(4), and any other associated measurement, storage and determination operations. Power source 110 may be constructed in any appropriate manner to perform each of these functions, and may include specialized circuitry to provide the requisite functionality.

The sampling of voltage and current is performed by the power source 110 to ensure that complex waveforms are sampled at a high enough rate to allow accurate determination of total energy (and/or true power). This allows the sampled values to be multiplied together along with the sampling interval to determine multiple instantaneous energy samples that may be integrated or summed over a predefined total time (e.g., the arc time or other defined time period) to determine total energy input into the weld, not just an average energy. Further, because the various determinations are performed by power source 110, the sampled voltage and current values do not have to be transferred out of the power source through connections that may ultimately slow the determinations. Power source 110 may sample voltage and current values via any suitable sampling method, such as by use of an electrical measuring circuit capable of high speed sampling of the output welding waveform, and analog-to-digital conversion of the sampled values.

The welding system 100 is also capable of providing for the display of one or more of the instantaneous energy, instantaneous power, true energy, and true power to the operator of the welding equipment in various ways. For example, the values may be visually presented on display 115 for an operator's review. Alternatively, the information may be displayed on a portable electronic device (e.g., a laptop, PDA or smart-phone) that is operatively connected (e.g., by a wired or wireless connection) to the welding system 100. Alternatively, or additionally, the information could be audibly indicated. The values may also be transmitted over a network connection to allow central review of the welding operation by a supervisor, such as a quality control engineer or shift supervisor.

In this embodiment, processing of and/or determinations using the sampled voltage and current is performed in real time within the power source 110 via any suitable processing and determination method. For example, the processing and/or determinations may be performed by a processor 111 such as a digital signal processor or a software-controlled processor, and/or via a look-up table such as a programmed EEPROM memory being addressed by the sampled voltage and current values to yield instantaneous energy values.

Figure 4A:
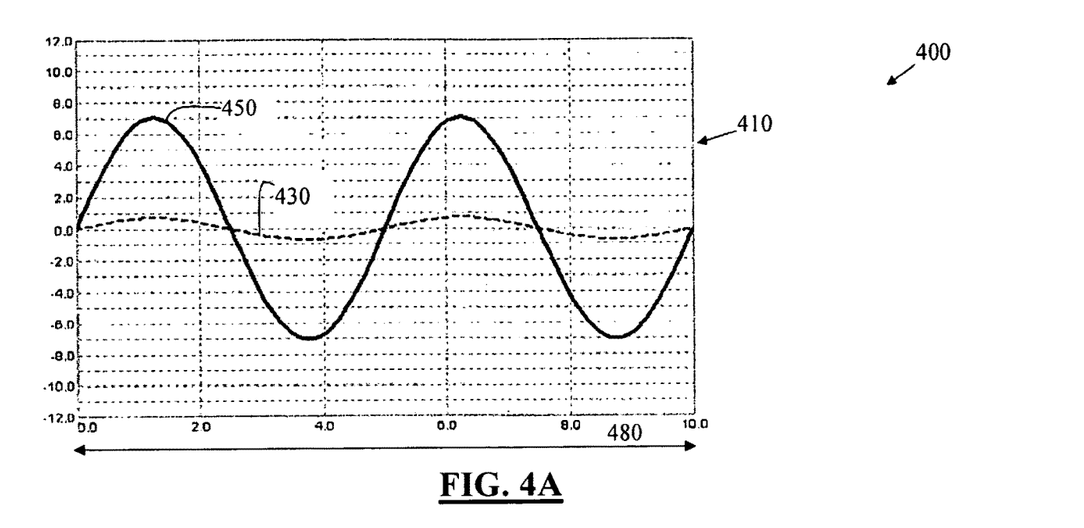
FIGS. 4A and 4B are diagrams illustrating an energy determination strategy according to an exemplary embodiment of the invention.
Figure 4B:
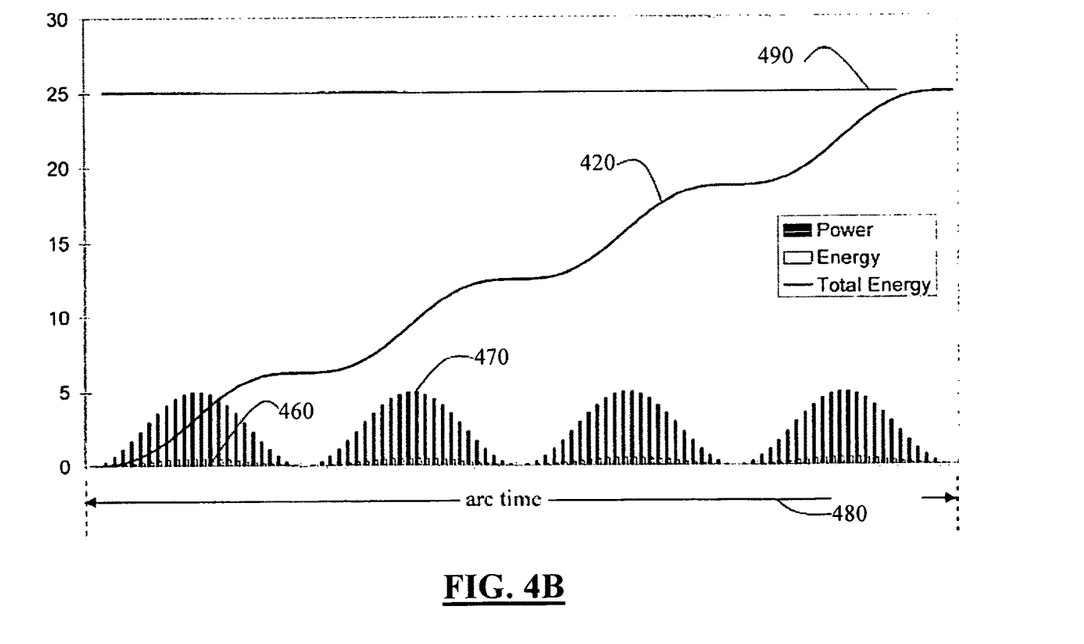

FIGS. 4A and 4B illustrate in more detail an exemplary method of energy determination according to the invention. Method 400 determines the energy 420 input to a weld via a welding operation (e.g., using the welding system of FIG. 1). FIG. 4A illustrates an exemplary welding output waveform 410 with voltage 430 and current 450 over an arc time 480. According to the process described above, pairs of instantaneous voltage levels and instantaneous current levels are sampled from voltage 430 and current 450. Using these sampled values, instantaneous energy values 460 and/or instantaneous power values 470 may be determined, as shown in FIG. 4B. The instantaneous energy values 460 then may be integrated or summed over the arc time 480 to determine the total energy value 490 input to the weld over the arc time 480. As can also be seen in FIG. 4B, the cumulative total energy 420 at any subset of the arc time 480 may be determined, and increases over as energy is input to the weld via the arc 190 during an arc welding operation. When the weld is complete at the end of the arc time 480, the final total energy 490 is known. Any of this sampled or determined data may be displayed by the welding system 100 via display 115 or portable device, as discussed above.

Because the cumulative total energy 420 at any point and the total energy 490 at the end of the arc time 480 are known, either or both of these values may be compared to known standards of acceptability to determine whether or not the quality of the weld is acceptable. This comparison may be performed by the operator of the welding system 100, using displayed energy values and a reference that indicates the tolerances for the particular material or materials being welded. Alternatively, the welding system 110 may automatically determine if the weld is acceptable by comparing the cumulative total energy 420 and/or total energy 490 to standards regarding the material or materials being welded. In this regard, the standards may be input and/or stored in the welding system 100 by any suitable method. For example, the standards may be input via user interface 116 and/or another portable device. Alternatively, the standards may be accessible to the welding system 100 by network connection based on a determination of the type of material or materials being welded. The type of material may be input by the operator of the welding system, or automatically determined by the welding system via bar code, RFID, material sensors, or the like.

If the value of total true energy falls outside the standards, the welding system 100 may take action, such as alerting the operator via a visual or audible warning, halting welding operations, logging an event, or any other appropriate action. As a result, the operator can have confidence that the welding operation is proceeding within acceptable parameters.

Additionally, a total energy per unit length of the weld may be determined and displayed for the operator. In this regard, the total energy may be measured for a particular time interval (e.g., the arc time or subset thereof), and divided by the length of the weld during that particular time interval. The total energy may thus be presented as total energy per unit length (e.g., kJ/inch or kJ/mm). Similarly, a power per unit length may be determined and displayed for the operator by determining a power input level for a particular time interval, and dividing that value by a distance traveled by the welding tool 130 during the particular time interval. The power may this be presented as power per unit length (e.g., watts/inch or watts/mm).

The total length of the weld may be determined by any suitable method. For example, in manual systems, an operator may measure the weld, and input the length into the welding system 100. Alternatively, the welding system 100 may include sensors that determine the position of any of the welding tool 130, workpiece 140 or any other moving part of the welding system related to welding tool 130 and/or workpiece 140. A welding system 100 that includes such sensors can utilize the position information and operational information of the welding process to determine the total weld length. As a still further example, in automatic welding systems, the welding tool 130 and/or workpiece 140 moves according to computerized control. Thus, the welding system 100 may monitor the position and operation of the welding tool 130 and/or workpiece 140 (or other moving part of the welding system 100) to determine a weld length.

Additionally, the total length of the weld may be measured indirectly by monitoring the relative travel speeds of the welding tool 130 and/or workpiece 140 to each other by any suitable method. For example, an operator may input the travel speeds into the welding system 100. Alternatively, the welding system 100 may include sensors that determine the travel speeds of the welding tool 130 and/or workpiece 140. As a still further example, in automatic welding systems, the welding tool 130 and/or workpiece 140 moves according to computerized control. Thus, the welding system 100 may monitor the travel speeds of the welding tool 130 and/or workpiece 140 (or other moving part of the welding system 100) to determine travel speeds. Alternatively, the welding travel speed may be controlled by some other external device which provides the travel speed to the welding system 100.

In addition to displaying the true energy per unit length, this value may be compared to known standards of acceptability to determine whether or not the quality of the weld is acceptable. This comparison may be performed by the operator of the welding system 100, using the displayed energy per unit length value and a reference that indicates the tolerances for the particular material or materials being welded. Alternatively, the welding system 110 may automatically determine if the weld is acceptable by comparing the total energy per unit length to standards regarding the material or materials being welded. In this regard, the standards may be input and/or stored in the welding system 100 by any suitable method. For example, the standards may be input via user interface 116 and/or another portable device. Alternatively, the standards may be accessible to the welding system 100 by network connection based on a determination of the type of material or materials being welded. The type of material may be input by the operator of the welding system, or automatically determined by the welding system via bar code, RED, material sensors, or the like.

If the value of total energy per unit length falls outside the standards, the welding system 100 may take action, such as alerting the operator via a visual or audible warning, halting welding operations, logging an event, or any other appropriate action. As a result, the operator can have confidence that the welding operation is proceeding within acceptable parameters.

Figure 5:
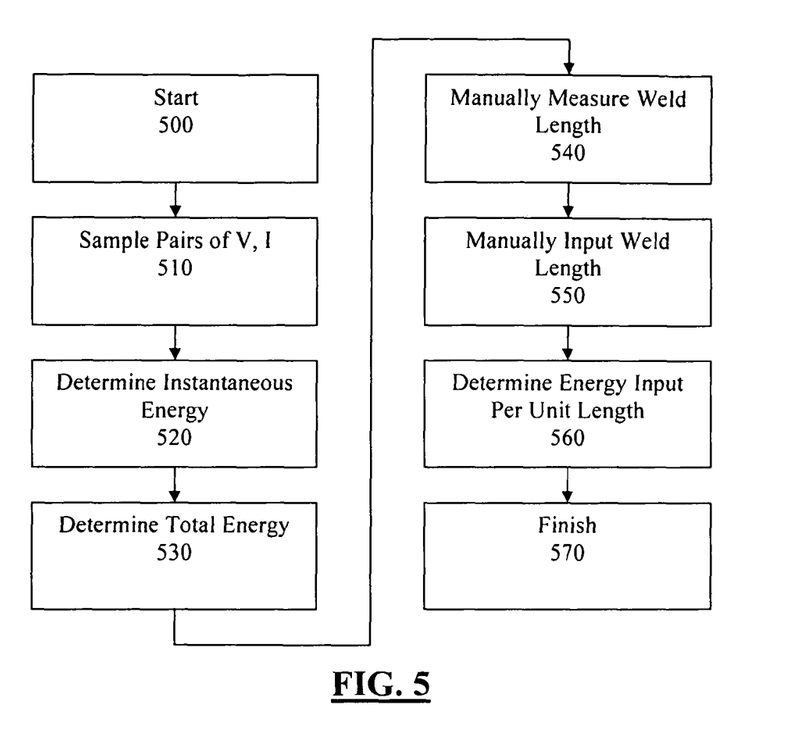
FIG. 5 is a diagram of a method of energy determination according to an exemplary embodiment of the invention.
Figure 6:
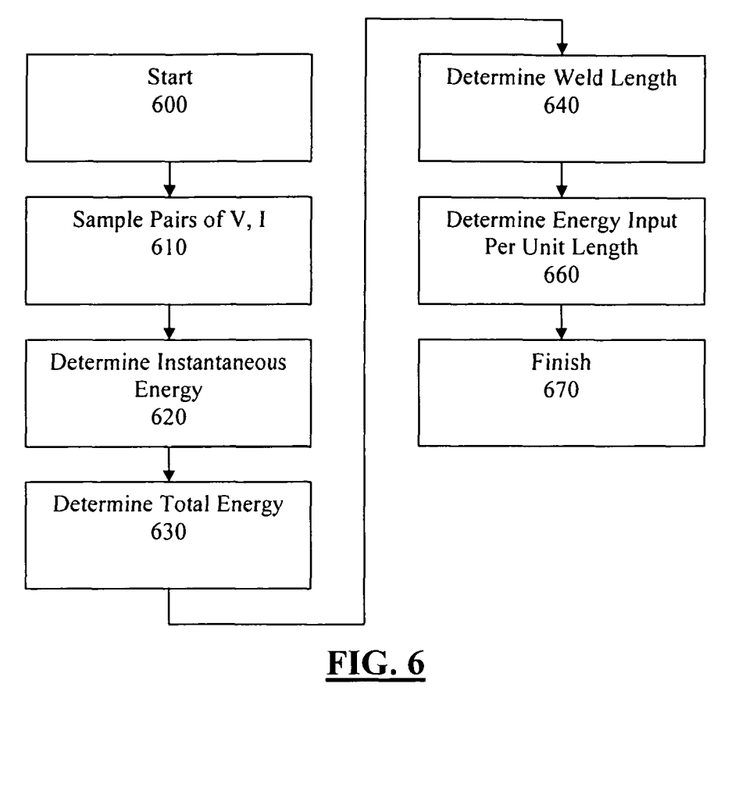
FIG. 6 is a diagram of another method of determining energy according to an exemplary embodiment of the invention.

FIGS. 5 and 6 illustrate exemplary methods of determining and displaying energy input per unit length. FIG. 5 illustrates a method utilizing a manually input weld length, while FIG. 6 illustrates a method utilizing an automatically determined weld length. These methods may be used with the welding system 100 described above, or with any suitable welding system.

In operation 510 of FIG. 5, corresponding pairs of instantaneous voltages and instantaneous currents are sampled from a welding output waveform. The corresponding pairs of instantaneous voltages and instantaneous currents are sampled at a particular sampling rate over a particular arc time. Operation 510 may be performed using any suitable hardware and/or software including, for example, analog-to-digital sampling devices operating at minimum sampling rates of between 8-10 KHz, or other appropriate sampling rates.

In operation 520, instantaneous energy values are determined from the pairs of sampled instantaneous voltages and currents. Each instantaneous energy value may be determined by determined the product of the sampling time interval Δt (corresponding to the particular sampling rate d the particular instantaneous voltage and current. Alternatively, each instantaneous energy value may be determined by addressing a look-up table with the corresponding current value and voltage value pair within the welding power source, and outputting the corresponding instantaneous energy value. Operation 520 may be performed by any suitable method, such as by a digital signal processor, a processor that executes software instructions, or a device (e.g., an EEPROM) or data structure (e.g., database or file) that stores the look up table.

In operation 530, a total energy is determined over the arc time from the instantaneous energy values. The total true energy may be determined by determining the sum of the plurality of instantaneous energy values within the welding power source. Operation 530 may be performed by any suitable method, such as by a digital signal processor or a processor that executes software instructions.

In operation 540, a weld length of the resultant weld is measured. The weld length may be measured in any suitable manner. For example, the weld length may be measured manually by using a manual measuring device a calibrated ruler or other manual measuring tool). Alternatively, the weld length may be measured automatically by using an automatic measuring device (e.g., a laser measuring system which detects and determines the length of the resultant arc weld) or various positional and/or movement sensors in the welding system.

In operation 550, the weld length is input into the welding power source. The weld length may be input in any suitable manner. For example, the weld length may be input by hand via a user interface (e.g., user interface 116 of FIG. 1, or FIG. 2, or another portable electronic device). The user interface may provide any suitable interface (e.g., a dial, a touch screen, a keyboard, a mouse to select a value from a menu, or speech recognition capability) for receiving the weld length. Other user interface means are possible as well, in accordance with various alternative embodiments.

In operation 560, a value of energy input per unit length is determined from the total energy value and the input weld length value. To determine the energy input per unit length, the total energy value may be divided by the input weld length. Alternatively, the value of energy per unit length may be determined by addressing a look-up table with the total energy value and the input weld length within the welding power source, and outputting the corresponding total energy per unit length. Operation 560 may be performed by a processor that executes software instructions, or a device (e.g., a EEPROM) or data structure (e.g., database or file) that stores the look-up table.

In operation 560, energy input per unit length may be determined by the following equation:

$$\text{Energy/Unit Length (J/in)} = [\text{Total Energy (Joules)}]/[\text{weld length (inches)}] \quad (5)$$

or:

$$\text{Energy/Unit Length (J/m)} = [\text{Total Energy (Joules)}]/[\text{weld length (mm)}] \quad (6)$$

Other formulas for of energy input may be utilized in accordance with various embodiments.

In the method illustrated in FIG. 5, the energy per unit length may be determined in view of the simple entering of a measured length (e.g., in inches or mm). Because the operator is simply entering the measured length, the operator does not have to worry about writing down and then entering multiple variables having different units, or making manual determinations with a calculator, which could lead to human error.

As an alternative to the method illustrated in FIG. 5, operation 550 may utilize entry of the travel speed of the welding operation rather than the total weld distance (as discussed above). This data, in conjunction with the measured instantaneous voltage and current, and the measured time, can also provide energy input per unit length, according to the following formulas:

$$\text{Energy/Unit Length (J/in)} = \frac{[\text{Total Energy (Joules)}]}{[\text{travel speed (in/min)} * \text{arc time (min)}]} \quad (7)$$

$$\text{Energy/Unit Length (J/in)} = \frac{[\text{Total Energy (Joules)} * 60]}{[\text{travel speed (in/min)} * \text{arc time (sec)}]} \quad (8)$$

$$\text{Energy/Unit Length (J/mm)} = \frac{[\text{Total Energy (Joules)}]}{[\text{travel speed (mm/min)} * \text{arc time (min)}]} \quad (9)$$

$$\text{Energy/Unit Length (J/mm)} = \frac{[\text{Total Energy (Joules)} * 60]}{[\text{travel speed (mm/min)} * \text{arc time (sec)}]} \quad (10)$$

FIG. 6 illustrates the operations of an automated welding system (e.g., using a robotic welder). In such a system, the travel speed and/or length of the weld may be known or automatically determined by the welding system. Thus, these values do not have to be input by an operator after the weld is completed. The method of FIG. 6 may be utilized with the welding system 100 discussed above, or any suitable welding system.

In operation 610, corresponding pairs of instantaneous voltages and instantaneous currents are sampled from a welding output waveform. The corresponding pairs of instantaneous voltages and instantaneous currents are sampled at a particular sampling rate over a particular arc time. Operation 610 may be performed using any suitable hardware and/or software including, for example, analog-to-digital sampling devices operating at minimum sampling rates of between 8-10 KHz, or other appropriate sampling rates.

In operation 620, instantaneous energy values are determined from the pairs of sampled instantaneous voltages and currents. Each instantaneous energy value may be determined by determining the product of the sampling time interval $\Delta t$ (corresponding to the particular sampling rate d the particular instantaneous voltage and current. Alternatively, each instantaneous energy value may be determined by addressing a look-up table with the corresponding current value and voltage value pair within the welding power source, and Outputting the corresponding instantaneous energy value. Operation 620 may be performed by any suitable method, such as by a digital signal processor, a processor that executes software instructions, or a device (e.g., an EEPROM) or data structure (e.g., database or file) that stores the look up table.

In operation 630, a total energy is determined over the arc time from the instantaneous energy values. The total true energy may be determined by determining the sum of the plurality of instantaneous energy values within the welding power source. Operation 530 may be performed by any suitable method, such as by a digital signal processor or a processor that executes software instructions.

In operation 640, a weld length of the resultant weld is determined. The weld length may be determined in any suitable manner. For example, the weld length may be determined by sensors located in the welding system that determine the location and movement of the welding tool, workpiece, or any other moving part of the welding system. Alternatively, the weld length may be determined according to the defined movement of portions of the welding system according to its programmed welding instructions.

In operation 660, a value of energy input per unit length is determined from the total energy value and the determined weld length value. To determine the energy input per unit length, the total energy value may be divided by the input weld length. Alternatively, the value of energy per unit length may be determined by addressing a look-up table with the total energy value and the input weld length within the welding power source, and outputting the corresponding total energy per unit length. Operation 660 may be performed by a processor that executes software instructions, or a device (e.g., a EEPROM) or data structure (e.g., database or file) that stores the look-up table. Operation 660 may utilize formulas (5) and (6) above, or any other suitable formulas.

In the method illustrated in FIG. 6, the energy per unit length may be determined in a completely automatic fashion, thereby eliminating operator error in any such determination.

As an alternative to the method illustrated in FIG. 6, operation 660 may utilize the travel speed of the welding operation rather than the total weld distance (as discussed above). This data, in conjunction with the measured instantaneous voltage and current, and the measured time, can also provide energy input per unit length, according to formulas (7)-(10) above. In this regard, welding power source 110 may automatically keep track of the arc time 480 of the arc welding operation using, for example, a timer device or a counter device within the welding power source 110. The weld length may be automatically determined within the welding power source by multiplying the arc time by a predetermined travel speed of the arc welding operation. Alternatively, the weld length may be automatically determined within the welding power source by addressing a look-up table with the arc time and the predetermined travel speed of the arc welding operation, and outputting the corresponding weld length value.

In addition to the display and monitoring of the acceptability of the total energy and energy per unit length values discussed above, the true power and power per unit length may also be displayed and monitored in a similar manner.

In addition to the measurement of energy and/or power per unit length of the weld, the welding system 100 may measure any characteristic (e.g., length, mass, volume) of the welding wire 180 in conjunction with the amount of energy or power used. For example, as shown in FIG. 4B, a particular welding operation may have total energy 490 input to a weld during arc time 480. To form the weld, a particular amount of welding wire 180 is used by the welding system 100. This particular amount of welding wire 180 has various characteristics (e.g., length, mass and volume). The total energy 490 input into the weld may be divided by any of these characteristics to determine an energy input per unit of the particular characteristic.

The characteristics of the welding wire 180 may be measured and input into the welding system 100 by the operator, or automatically determined or measured by the welding system 100. For example, the total length of the welding wire 180 used can be measured by the operator and input to the welding system 100 via user interface 116, or could be automatically determined by measuring wire travel speed 180, revolution of feed wheels in feeder 170, or the like. Other characteristics may be measured directly in any suitable manner, or can be extrapolated from measured values. For example, mass may be determined by measurement of the wire supply 160 at the beginning and end of the arc time 480, or can be extrapolated from measured length values if the wire type is known. In this regard, wire data may be input and/or stored in the welding system 100 via user interface 116 and/or another portable device. Alternatively, the data may be accessible to the welding system 100 by network connection based on a determination of the type of material or materials being welded. The type of material may be input by the operator of the welding system, or automatically determined by the welding system via bar code, RFID, material sensors, or the like.

In addition to the arc-based welding system 100 described in FIG. 1, welding system 100 may also be a hybrid welding system. As a non-limiting example, hybrid laser welding has recently gained popularity. Hybrid laser welding simultaneously utilizes an arc and a laser beam to form a weld, where the laser provides improved penetration characteristics, with a low additive heat input and small heat-affected zone. To provide such a system, a laser device would be arranged near (or in conjunction with) welding tool 130 within the welding system 100 depicted in FIG. 1. The laser device could then direct a laser to workpiece 140 in conjunction with arc 190. In order to comprehend the additional energy input into the weld by the laser, the welding system 100 may also be configured to measure, display and monitor the energy input to the weld via the laser (or other secondary energy source in a hybrid arrangement), and include this energy in the total energy value discussed above. This total energy value can then be utilized in the same manner discussed above—for example, to determine: a total or instantaneous energy used in the welding operation; an energy per unit length of the weld; or an energy per unit length of a characteristic of welding wire 180.

Figure 7:
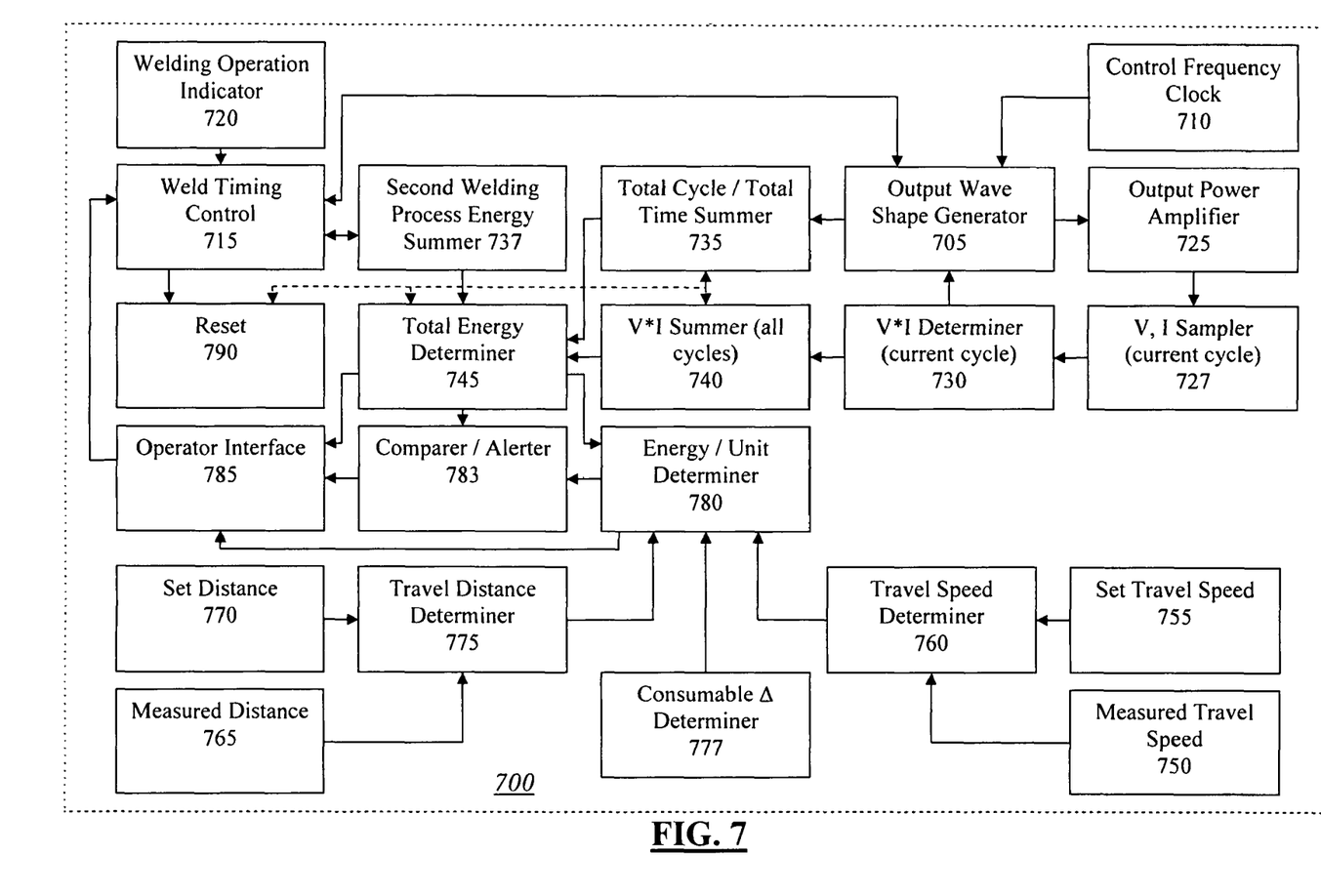
FIG. 7 is a diagram of a system for measuring energy according to an exemplary embodiment of the invention.
Figure 8:
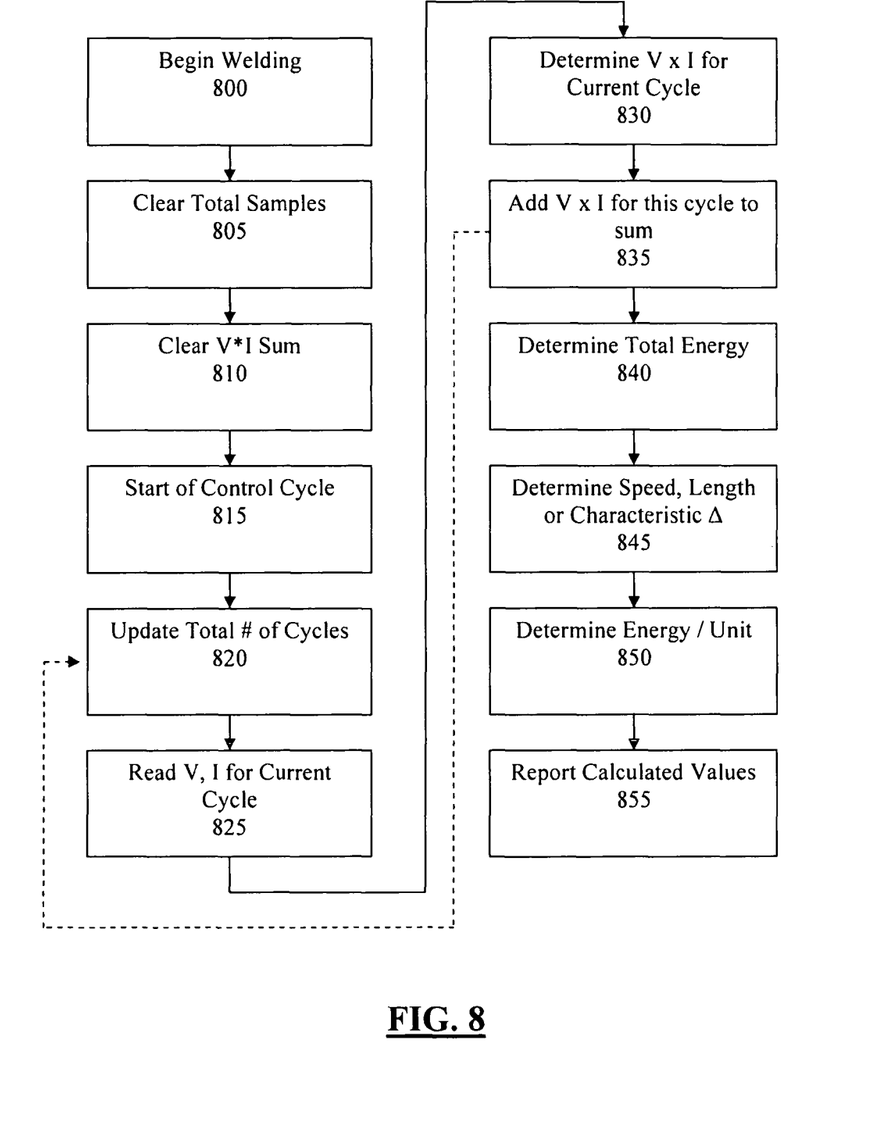
FIG. 8 is a diagram of another method of determining energy according to an exemplary embodiment of the invention.

FIG. 7 illustrates an exemplary embodiment of a welding system 700. This system 700 may be used in conjunction with that shown in FIG. 1, or in any other suitable welding system, and may be utilized to perform any of the methods discussed herein. FIG. 8 illustrates an exemplary method utilizing the system shown in FIG. 7.

In welding system 700, output wave shape generator 705 forms the output welding waveforms utilized during welding (e.g. the waveform shown in FIG. 4A), in conjunction with control frequency clock 710 and weld timing control 715. Control frequency clock 710 provides constant timing output, while weld timing control 715 defines the beginning and end of the welding operations via welding operation indicator 720. Welding operation indicator 720 can be any type of module that indicates whether welding operations are being conducted, such as a sensor on a welding gun trigger, or a flag in robotic commands that is activated when welding commences. Output power amplifier 725 amplifies the wave shapes generated by output wave shape generator 705 into repeating current (I) and voltage (V) waveforms useful for welding operations. As discussed above, these waveforms may be parsed into discrete sampling periods. For each sampling period, total sample summer 735 updates the cumulative number of sample periods (and/or sample time) since the welding operation indicator 715 indicated the beginning of the current welding operation, V, I sampler 727 samples the voltage (V) and current (I) levels output by amplifier 725, V*I determiner 730 determines the V*I value, and V*I summer 740 sums the determined V*I value from V*I determiner 730 with each of the determined V*I values from all previous sampling periods of the current operation. The values from summers 735 and 740, along with the time for each cycle, are then used by total energy determiner 745 to determine the total cumulative energy (e.g., cumulative total energy 420 of FIG. 4B) used during the welding operation (i.e., since the welding operation indicator 715 indicated the beginning of the current welding operation). Total energy determiner 745 may also take into account any energy input into the weld by a second welding process in a hybrid arrangement with the arc welding process, such as the hybrid laser welding process discussed above. This additional energy is summed by second welding process energy summer 737 during the welding operation.

In order to determine the energy input per unit length during the welding operation, either or both of the travel speed determiner 760 and travel distance determiner 775 provide speed or distance information to energy/unit determiner 780, which then determines an energy per unit length value (as discussed above in, e.g., the methods of FIGS. 5 and 6). Travel speed determiner 760 may obtain travel speed information either from a set travel speed 755 or measured travel speed 750. Set travel speed is the speed of travel set by the welding operator or automatic welding system, while measured travel speed is measured by a sensor of any suitable variety. Travel distance determiner 775 may obtain travel distance either from a set distance 770 or measured distance 765. Set distance is a distance set by the welding operator or automatic welding system, while measured distance is a distance measured manually by the operator, or automatically by the welding system. Energy/unit determiner 780 then uses the information output from total energy determiner 745 and travel speed determiner 760 and/or travel distance determiner 775 to determine the amount of energy input to a weld per unit length during the welding operation, according to any of the equations (5)-(10) discussed above, or any other suitable alternative equations.

Any of the information determined in total energy determiner 745 and/or energy/unit determiner (or any other related information) may be reported on operator interface 785 (e.g. display 115 and/or user interface 116 of FIG. 1), or via any other suitable medium usable with welding system 700. The information may be used by the operator, quality control personnel, management, or the like to ensure a high-quality operation, as discussed in detail above.

As discussed above, welding system 700 may also measure any characteristic (e.g., length, mass, volume) of the welding consumable 180 in conjunction with the amount of energy or power used. Consumable Δ determiner 777 is provided to monitor and determine the change in the physical characteristic of the welding consumable. Energy/unit determiner 780 then uses the information output from total energy determiner 745 and consumable Δ determiner 777 to determine the amount of energy input per physical characteristic of the welding consumable, similarly to that discussed above for the welding wire.

Additionally, comparer/alerter 783 is provided to compare any of the sampled or determined values in system 100 to any normal or desired operating ranges for that particular value, and to provide an alert if the values fall outside of the normal if desired operating range. Comparer/alerter 783 may provide its comparisons or alerts through operator interface 785, or any other appropriate reporting, monitoring or alerting system.

Although several elements of welding system 700 are depicted in schematic form in FIG. 7, the arrangement of these elements is not limited. The elements may be freely combined or further divided as appropriate to provide the inventive functionality.

FIG. 8 illustrates a method of determining energy input to a weld, and/or energy input per unit length to a weld, in accordance with the system illustrated in FIG. 7, and with any of the systems disclosed herein. The method begins at operation 800, when weld timing control 715 determines that welding operations have begun via an indication by welding operation indicator 720. The method then clears any previous data from total sample/total time summer 735 (operation 805) and V*I summer 740 (operation 810), the functions of which are described above. At the beginning of each sample period (operation 815), the total sample/total time summer 735 updates the number of sample periods that have been measured during the current welding operation (operation 820), the V, I sampler 727 samples voltage (V) and current (I) (operation 825) and the V*I determiner 730 determines V*I for that sample period (operation 830). V*I Summer 740 then adds the V*I value for that sample period to a sum of V*I values for each previous sample period of the welding operation (operation 835). Operations 820, 825, 830 and 835 may be repeated until the end of the welding operations. Total energy determiner 745 may determine a total cumulative energy input into the weld by taking into account the total V*I from V*I summer 740 and the total sample periods (or total time) from total sample/total time summer 735 (operation 840). Total energy determiner 745 may also take into account any energy input into the weld by a second welding process in a hybrid welding arrangement, as reported by second welding process energy summer 737.

The total weld length, or the weld speed, is then determined using travel distance determiner 775 or travel speed determiner 760 (operation 845). These values are then used (either solely or in combination) in conjunction with the total energy determined by total energy determiner 745 to determine an energy per unit length (operation 850). Lastly, the total energy and/or energy per unit length may be reported on operator interface, or otherwise reported in welding system 700 (operation 855), in the manner discussed above.

Alternatively, as discussed above, welding system 700 may also determine the amount of energy input per physical characteristic of the welding consumable. In such an arrangement, the change in the physical characteristic of the welding consumable is determined by consumable Δ determiner 777 (operation 845). This value is then used in conjunction with the total energy determined by total energy determiner 745 to determine the amount of energy input per physical characteristic of the welding consumable (operation 850). Lastly, the energy input per physical characteristic may be reported on operator interface, or otherwise reported in welding system 700 (operation 855), in the manner discussed above.

By using this invention, the total energy input to a weld can be more accurately determined because the voltage and current are sampled: (1) in the correct phase relative to each other; (2) at a frequency necessarily greater than that of the output frequency being produced; and (3) over the exact number of sample periods during which the welding output is on. Further, this invention provides an accurate measurement of the energy input into a particular weld without requiring the use of expensive external measurement devices.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding power supply configured to monitor a welding operation, comprising:
a processor that executes software to process measured welding voltage and current to implement:
a first determiner to determine, from the measured welding voltage and current, a total energy input into a weld during a first time period;
a second determiner to determine a change in a physical characteristic of a welding consumable used in the welding operation during the first time period, said physical characteristic including at least one of a length, a mass, and a volume of the welding consumable;
a third determiner to determine an energy input per physical characteristic of the welding consumable during the first time period using the determined total energy input and the determined change in the physical characteristic of the welding consumable; and
a comparer to compare the determined energy input per physical characteristic of the welding consumable to an acceptable range of values of energy input per physical characteristic of the welding consumable for the welding operation.

2. The welding power supply of claim 1, wherein the processor executes the software to further implement a reporter to report the determined energy input per physical characteristic of the welding consumable.

3. The welding power supply of claim 1, wherein the processor executes the software to further implement an alerter to issue an alert when the energy input per physical characteristic of the welding consumable is outside of the acceptable range of values of energy input per physical characteristic of the welding consumable.

4. The welding power supply of claim 1, wherein the first determiner determines the total energy input into the weld during the first time period by adding a first total energy input into the weld during the first time period by a first welding process and a second total energy input into the weld during the first time period by a second welding process.

5. The welding power supply of claim 1, further comprising a user interface that displays the determined energy input per physical characteristic of the welding consumable.

6. The welding power supply of claim 5, wherein the user interface is configured to provide an alert when the energy input per physical characteristic of the welding consumable is outside of the acceptable range of values of energy input per physical characteristic of the welding consumable.

7. A welding system, comprising:
a wire feeder;
a welding wire delivered by the wire feeder; and
a power supply operatively connected to the welding wire to supply a welding waveform to the welding wire during a welding operation, wherein the power supply is configured to measure welding voltage and current during the welding operation, and wherein the power supply includes a processor that executes software to process the measured welding voltage and current such that the processor is configured to:
determine, from the measured welding voltage and current, a total energy input into a weld during a first time period;
determine a change in a physical characteristic of the welding wire used in the welding operation during the first time period, said physical characteristic including one or more of a length, a mass, and a volume of the welding wire;
determine an energy input per physical characteristic of the welding wire during the first time period using the determined total energy input and the determined change in the physical characteristic of the welding wire; and
compare the determined energy input per physical characteristic of the welding wire to an acceptable range of values of energy input per physical characteristic of the welding wire for the welding operation.

8. The welding system of claim 7, wherein the processor is further configured to report the determined energy input per physical characteristic of the welding wire.

9. The welding system of claim 7, wherein the processor is further configured to generate an alert when the energy input per physical characteristic of the welding wire is outside of the acceptable range of values of energy input per physical characteristic of the welding wire.

10. The welding system of claim 7, wherein the processor determines the total energy input into the weld during the first time period by adding a first total energy input into the weld during the first time period by a first welding process and a second total energy input into the weld during the first time period by a second welding process.

11. The welding system of claim 7, wherein the power supply further comprises a user interface that displays the determined energy input per physical characteristic of the welding wire.

12. The welding system of claim 11, wherein the user interface is configured to provide an alert when the energy input per physical characteristic of the welding wire is outside of the acceptable range of values of energy input per physical characteristic of the welding wire.

13. The welding system of claim 7, wherein the processor is further configured to determine a length of the weld, and determine an energy input per unit length during the first time period using the determined total energy input and the determined length of the weld.

14. The welding system of claim 13, wherein the processor is further configured to generate an alert when the energy input per unit length is outside of an acceptable range of values of energy input per unit length.

15. The welding system of claim 13, wherein the power supply further comprises a user interface that displays the determined energy input per unit length.

* * * * *